United States Patent
Church et al.

(10) Patent No.: US 10,229,685 B2
(45) Date of Patent: Mar. 12, 2019

(54) SYMBOL SEQUENCE ESTIMATION IN SPEECH

(71) Applicant: INTERNATIONAL BUSINESS MACHINES CORPORATION, Armonk, NY (US)

(72) Inventors: Kenneth W. Church, Yorktown Heights, NY (US); Gakuto Kurata, Tokyo (JP); Bhuvana Ramabhadran, Yorktown Heights, NY (US); Abhinav Sethy, Yorktown Heights, NY (US); Masayuki Suzuki, Tokyo (JP); Ryuki Tachibana, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/409,126

(22) Filed: Jan. 18, 2017

(65) Prior Publication Data

US 2018/0204567 A1    Jul. 19, 2018

(51) Int. Cl.
*G10L 15/26*    (2006.01)

(52) U.S. Cl.
CPC .................................. *G10L 15/26* (2013.01)

(58) Field of Classification Search
CPC ....... G10L 15/197; G10L 15/02; G10L 15/14; G10L 15/18
USPC ........................................................ 704/235
See application file for complete search history.

(56) References Cited

U.S. PATENT DOCUMENTS

| 2008/0221882 | A1 | 9/2008 | Bundock et al. |
| 2011/0046953 | A1 | 2/2011 | Arun et al. |
| 2014/0222419 | A1 | 8/2014 | Romano et al. |
| 2017/0123492 | A1* | 5/2017 | Marggraff ............. G06F 3/0236 |

FOREIGN PATENT DOCUMENTS

| CN | 101996629 A | 3/2011 |
| CN | 102708862 A | 10/2012 |
| CN | 102760436 A | 10/2012 |

OTHER PUBLICATIONS

Cho et al., "Learning Phrase Representations using RNN Encoder—Decoder for Statistical Machine Translation", arXiv, Sep. 2014, 15 pages.
Chung, et al., "Empirical Evaluation of Gated Recurrent Neural Networks on Sequence Modeling", arXiv, Dec. 2014, pp. 1-9.
Gers, et al., "Learing to Forget: Continual Prediction with LSTM", Technical Report IDSIA, Jan. 1999, pp. 1-19.

(Continued)

*Primary Examiner* — Jakieda R Jackson
(74) *Attorney, Agent, or Firm* — Tutunjian & Bitetto, P.C.; Vazken Alexanian

(57) ABSTRACT

Symbol sequences are estimated using a computer-implemented method including detecting one or more candidates of a target symbol sequence from a speech-to-text data, extracting a related portion of each candidate from the speech-to-text data, detecting repetition of at least a partial sequence of each candidate within the related portion of the corresponding candidate, labeling the detected repetition with a repetition indication, and estimating whether each candidate is the target symbol sequence, using the corresponding related portion including the repetition indication of each of the candidates.

25 Claims, 8 Drawing Sheets

(56) References Cited

OTHER PUBLICATIONS

Greff, et al., "LSTM: A Search Space Odyssey", arXiv, Mar. 2015, 18 pages.
Jozefowicz, et al., "Exploring the Limits of Language Modeling", arXiv, Feb. 2016, 11 pages.
Koutnik, et al., "A Clockwork RNN", arXiv, Feb. 2014, 9 pages.
Yao, et al., "Describing Videos by Exploiting Temporal Structure" Computer Vision Foundation, Feb. 2015, pp. 4507-4515.
International Search Report issued in PT/IB2017/057599 dated Mar. 14, 2018, 10 pages.

\* cited by examiner

"My phone number is 0 8 0 0 8 0 1 2 3 4 oh cool it's easy to remember yeah and the number is 5 5 1 3 1 hmm 5 1 3 1 right"

|   | Candidates | 8-digits | 3-digits |
|---|---|---|---|
| 1 | 08008012551 | 0 8 0 0 8 0 1 2 | 5 5 1 |
| 2 | 08008012513 | | 5 1 3 |
| 3 | 08008012131 | | 1 3 1 |
| 4 | 08008012513 | | 5 1 3 |
| 5 | 08008012131 | | 1 3 1 |
| 6 | 80080123131 | 8 0 0 8 0 1 2 3 | 5 5 1 |
|   | ⋮ | ⋮ | ⋮ |
|   | 00801234551 | 0 0 8 0 1 2 3 4 | 5 5 1 |
|   | ⋮ | ⋮ | ⋮ |

*FIG.3*

"My phone number is 0 8 0 0 8 0 1 2 3 4 oh cool it's easy to remember yeah and the number is 5 5 1 3 1 hmm 5 1 3 1 right"

| | Candidates | 3-digits | 4-digits | 4-digits |
|---|---|---|---|---|
| 1 | 08008015513 | 0 8 0 | | 5 5 1 3 |
| 2 | 08008015131 | | 0 8 0 1 | 5 1 3 1 |
| 3 | 08008015131 | | | 5 1 3 1 |
| 4 | 08080125513 | | | 5 5 1 3 |
| 5 | 08080125131 | | 8 0 1 2 | 5 1 3 1 |
| 6 | 08080125131 | | | 5 1 3 1 |
| 7 | 08001235513 | | 0 1 2 3 | 5 5 1 3 |
| | ⋮ | | ⋮ | ⋮ |
| | 08012345513 | | 1 2 3 4 | 5 5 1 3 |
| | ⋮ | | ⋮ | ⋮ |
| | 80080125513 | 8 0 0 | 8 0 1 2 | 5 5 1 3 |
| | ⋮ | ⋮ | ⋮ | ⋮ |
| | 00801235513 | 0 0 8 | 0 1 2 3 | 5 5 1 3 |
| | ⋮ | ⋮ | ⋮ | ⋮ |
| | 08012345513 | 0 8 0 | 1 2 3 4 | 5 5 1 3 |
| | ⋮ | ⋮ | ⋮ | ⋮ |

*FIG.4*

"My phone number is 0 8 0 0 8 0 1 2 3 4 oh cool it's easy to remember yeah and the number is 5 5 1 3 1 hmm 5 1 3 1 right"

| | Candidates | Left Words | Right Words |
|---|---|---|---|
| 1 | 08008012 551 | My phone number is | 3 1 hmm 5 1 3 1... |
| 2 | 08008012 513 | My phone number is | 1 hmm 5 1 3 1... |
| 3 | 08008012 131 | My phone number is | hmm 5 1 3 1 right |

| | Candidates | Left Words | Right Words |
|---|---|---|---|
| 1 | 08008012 551 | My phone number is | 3 1 hmm 5 1 3 1... |
| 2 | 08008012 513 | My phone number is | 1 hmm *Rep(3)* 1... |
| 3 | 08008012 131 | My phone number is | hmm 5 *Rep(3)* ... |

| | Candidates | Left Words | Mid Words | Right Words |
|---|---|---|---|---|
| 1 | 08008012 551 | My phone number is | 3 4 oh ... is | 3 1 hmm 5 1 3 1... |
| 2 | 08008012 513 | My phone number is | 3 4 oh ... is 5 | 1 hmm *Rep(3)* 1... |
| 3 | 08008012 131 | My phone number is | 3 4 oh ... is 55 | hmm 5 *Rep(3)* ... |

SYMBOL SEQUENCE ESTIMATION IN SPEECH

BACKGROUND

Technical Field

The present invention relates to estimation of symbol sequence in speech.

Description of the Related Art

A speech-recognition system generates text from audio data, such as recorded verbal conversation, in a process called speech-to-text. Searching for symbol sequences from verbal conversation is important for utilizing the text generated from a speech-to-text process, referred to as speech-to-text data. Existing symbol sequence search techniques are disclosed in US Patent Publication 2008/0221882A1, US Patent Publication 2014/0222419A1, and US Patent Publication 2011/0046953A1. However, there still remain difficulties in distinguishing one type of symbol sequence (e.g., phone numbers) from other types of symbol sequences (e.g., customer IDs) in speech-to-text data.

SUMMARY

According to a first aspect of the present invention, provided is a computer-implemented method including detecting one or more candidates of a target symbol sequence from a speech-to-text data, extracting a related portion of each candidate from the speech-to-text data, detecting repetition of at least a partial sequence of each candidate within the related portion of the corresponding candidate, labeling the detected repetition with a repetition indication, and estimating whether each candidate is the target symbol sequence, using the corresponding related, portion including the repetition indication of each of the candidates. According to the first aspect, the method can enable accurate identification of a target symbol sequence with less computational resources by utilizing an indication of repetition.

According to a second aspect of the present invention, optionally provided is the method of the first aspect, where the detecting the one or ore candidates of the target symbol sequence from the speech-to-text data includes extracting two or more symbol sequences that constitute each of the candidates, from the speech-to-text data, where the two or more symbol sequences are separate from each other in the speech-to-text data. According to the second aspect, the method can enable detection of candidates from distant locations in the speech-to-text data.

According to a third aspect of the present invention, optionally provided is the method of the second aspect, where detecting repetition of at least a partial sequence of each candidate within the related portion of the corresponding candidate includes detecting at least one of the two or more symbol sequences that constitute the corresponding candidate within the related portion of the corresponding candidates. According to the third aspect, the method can enable detection of a repetition corresponding to the symbol sequence, thereby improving the accuracy of estimation.

According to a fourth aspect of the present invention, optionally provided is the method of the second aspect where the extracting two or more symbol sequences are performed by extracting a predetermined number of symbol sequences, the two or more symbol sequences do not overlap, and the concatenation of the two or more symbol sequences forms each of the candidates. According to the fourth aspect, the method can enable of candidates from distant locations in the speech-to-text data.

According to a fifth aspect of the present invention, optionally provided is the method of the fourth aspect, where the related portion of each of the candidates includes a portion adjacent to the each of the candidates. According to the fifth aspect, the method can enable detection of a repetition corresponding to the symbol sequence, thereby in the accuracy of estimation.

According to a sixth aspect of the present invention, optionally provided is the method of the fifth aspect, where the estimating whether each candidate is the target symbol sequence, based on the repetition indication of each corresponding candidate includes estimating a probability that each candidate is the target symbol sequence by inputting the related portion of each candidate with the repetition indication into a recurrent neural network. According to the sixth aspect, the method can enable detection of the target symbol sequence with higher accuracy and less computational resource.

According to a seventh aspect of the present invention, optionally provided is the method of the sixth aspect of the sixth aspect, where the estimating whether each candidate is the target symbol sequence, based on the repetition indication of each corresponding candidate further includes determining which candidate outputs the highest probability from the recurrent neural network among the candidates. According to the seventh aspect, the method can enable detection of the target symbol sequence with higher accuracy and less computational resource.

According to an eighth aspect of the present invention, optionally provided is the method of the sixth aspect, where the extracting a related portion for each candidate from the speech-to-text data includes extracting a plurality of the related portions of the candidates from the speech-to-text data, where the estimating a probability that each candidate is the target symbol sequence by inputting the related portion of each of the candidates with labelled repetition into a recurrent neural network includes inputting each of the plurality of the related portions of the each of the candidates with labelled repetition into each of a plurality of recurrent neural networks, and where each of the plurality of the related portions of each of the candidates with repetition indications is input to each of the plurality of recurrent neural networks in a direction depending on a location of each of the plurality of the related portions to the each of the candidates. According to the eighth aspect, the method can enable detection of the target symbol sequence with higher accuracy and less computational resource, by utilizing relative locations between the candidates and the related portions in the speech-to-text data.

According to a ninth aspect of the present invention, optionally provided is the method further including requiring additional speech-to-text data in response to determining that the probabilities for the candidates are below a threshold. According to the ninth aspect, the method can enable another estimation of the target symbol sequence from a new speech-to-text data if the estimation from existing speech-to-text data is not considered to be reliable enough.

According to a tenth aspect of the present invention, optionally provided is the method of the first aspect, where the labeling the detected repetition with the repetition indication includes replacing the detected repetition with the repetition indication. According to the tenth aspect, the method can enable detection of the target symbol sequence with higher accuracy and less computational resources by deleting unnecessary information.

According to an eleventh aspect of the present invention, optionally provided is the method of the first aspect, where the labeling the detected repetition with the repetition indication includes labeling the detected repetition with an indication of a symbol length of the detected repetition. According to the eleventh aspect, the method can enable detection of the target symbol sequence with higher accuracy and less computational resources by utilizing information of a symbol length of the repetition.

According to an twelfth aspect of the present invention, optionally provided is the method of the first aspect, where the labeling the detected repetition with the repetition indication includes labeling the detected repetition with an indication of a location of the detected repetition in the each candidate. According to the twelfth aspect, the method can enable detection of the target symbol sequence with higher accuracy and less computational resources by utilizing information of a location of repetition.

According to a thirteenth aspect of the present invention, optionally provided is the method of the first aspect, further including detecting a similar portion that is similar to at least a partial sequence of each of the candidates from the related portion of each of the candidates, and labeling the detected similar portion with information indicating similarity, and where the estimating, whether each candidate is the target symbol sequence, using the corresponding related portion including the repetition indication of each of the candidates includes estimating whether each of the candidates is the target symbol sequence, based on the repetition indication and similar portions of each candidate. According to the thirteenth aspect, the method can enable detection of the target symbol sequence with higher accuracy and less computational resources by utilizing information of portions that are similar to the candidates.

The first-thirteenth aspects above, can also include apparatus that performs the described methods and computer program product causing a computer or programmable circuitry to perform the described methods. The summary clause does not necessarily describe all features of the embodiments of the present invention. Embodiments of the present invention can also include sub-combinations of the features described above.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 3 shows candidates according to an embodiment of the present invention;

FIG. 4 shows candidates according to another embodiment of the present invention;

FIG. 5 shows related portions according to an embodiment of the present invention;

FIG. 6 shows labeling, according to an embodiment of the present invention;

FIG. 7 shows labeling, according to another embodiment of the present invention;

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
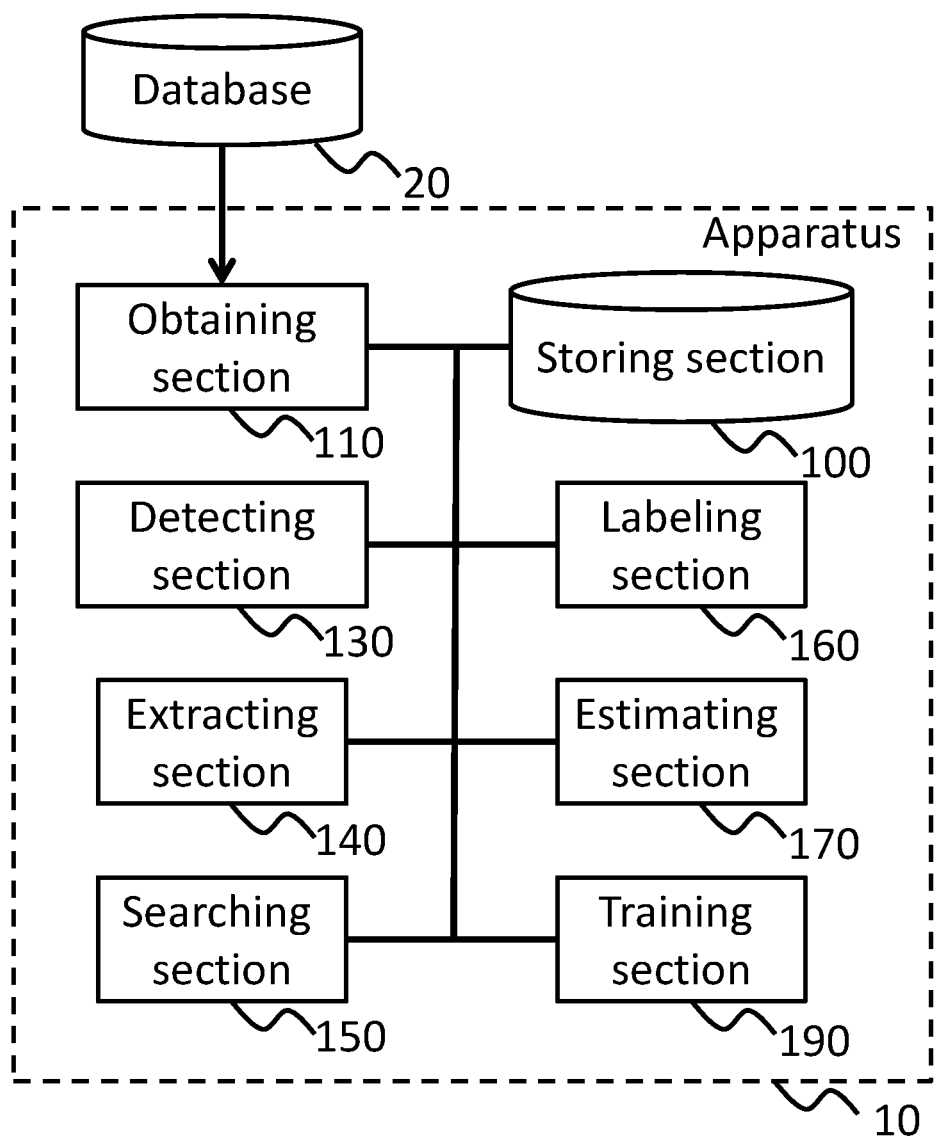
FIG. 1 shows an exemplary configuration of an apparatus, according tea an embodiment of the present invention.

FIG. 1 shows an exemplary configuration of an apparatus 10 (e.g., a computer, programmable circuitry, etc.), according to an embodiment of the present invention. The apparatus 10 can determine a target symbol sequence in speech-to-text data. The target symbol sequence determined by the apparatus 10 may be a phone number.

The apparatus 10 can comprise a processor and one or more computer readable mediums collectively including instructions. The instructions, when executed by the processor or programmable circuitry, can cause the processor or the programmable circuitry to operate as a plurality of operating sections. Thereby, the apparatus 10 can be represented as a storing section 100, an obtaining section 110, a detecting section 130, an extracting section 140, a searching section 150, a labeling section 160, an estimating section 170, and a training section 190.

The storing section 100 can store a variety of data used for operations of the apparatus 10. The storing section 100 can comprise a volatile or non-volatile memory. One or more other elements in the apparatus 10 (e.g., the obtaining section 110, the detecting section 130, the extracting section 140, the searching section 150, the labeling section 160, the estimating section 170, the training section 190, etc.) can communicate necessary data directly or via the storing section 100.

The obtaining section 110 can obtain speech-to-text data. The obtaining section 110 can obtain one or more training data, each training data including a speech-to-text data paired with a correct symbol sequence. The obtaining section 110 can obtain the speech-to-text data and/or the training data from a database 20, and can store them in the storing section 100. The obtaining section 110 can obtain the speech-to-text data and/or the training data from a microphone or other audio input device connected to the apparatus. The speech-to-text data and/or the training data can be captured human speech or mechanically synthesized human speech.

The detecting section 130 can detect one or more candidates, of a target symbol sequence from the speech-to-text data obtained by the obtaining section 110. The detecting section 130 can perform the detecting on the one or more candidates by extracting two or more symbol sequences that constitute each of the candidates from the speech-to-text data. The two or more symbol sequences are separate from each other in the speech-to-text data.

The extracting section 140 can extract one or more related portions of each candidate detected by the detecting section 130, from the speech-to-text data. In some embodiments, the related portion(s) may be text adjacent to each candidate in the speech-to-text data.

The searching section 150 can search repetition in the related portion extracted by the extracting section 140. The searching section 150 can detect repetition of at least a partial sequence of each candidate within the related portion of the corresponding candidate.

The labeling section 160 can label the detected repetition detected by the searching section 150, with a repetition indication.

The estimating section 170 can estimate whether each candidate is the target symbol sequence, using the corresponding related portion including the repetition indication of each of the candidates labeled by the labeling section 160. In son embodiments, the estimating section 170 can estimate a possibility of whether each candidate is the target symbol sequence by utilizing an estimation model such as a recurrent neural network.

The training section 190 can train the estimation model used for the estimation by the estimating section 170. The training section 190 can perform the training by using the training data obtained by the obtaining section 110.

Figure 2:
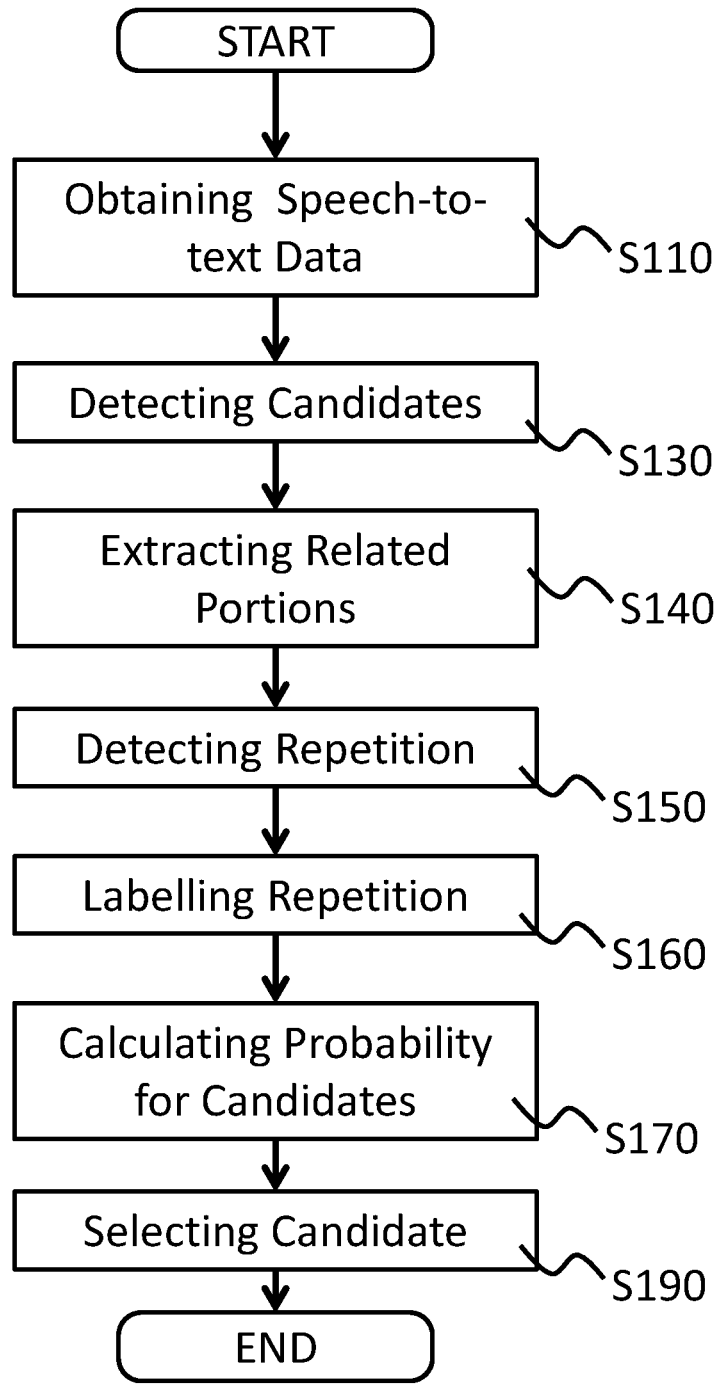
FIG. 2 shows an operational flow according to an embodiment of the present invention.

FIG. 2 shows a first operational flow according, to an embodiment of the present invention. The present embodiment describes an example in which an apparatus, such as the apparatus 10, performs the operations from S110 to S190, as shown in FIG. 2. The apparatus can estimate a target symbol sequence from speech-to-text data by performing the operations of S110-S190.

The target symbol sequence can be a sequence of symbols including, e.g., numbers, letters, and/or other characters, and may be meaningless by itself. In some embodiments, the target symbol sequence may be a phone number, a customer ID, a card number, an identification of person/group of people, an identification of product/service, and physical/email address, etc.

At S110, an obtaining section, such as the obtaining section 110, can obtain speech-to-text data. In other embodiments, the obtaining section 110 can obtain text data transcribed from a verbal conversation or monolog, or text data of a text message (e.g., online chat), as the speech-to-text data.

At S130, a detecting section such as the detecting section 130 can detect one or more candidates (which can hereinafter be referred to as "candidates") of a target symbol sequence from the speech-to-text data. The detecting section can detect candidates that have the same number of symbols as the target symbol sequence. When the target symbol sequence is a phone number having 11 symbol sequences (or regarded as 11-digits), the detecting section can detect one or more candidates having 11 symbol sequences from the speech-to-text data.

The detecting section can extract two or more symbol sequences that constitute each of the candidates, from the speech-to-text data, such that the two or more symbol sequences are separate from each other in the speech-to-text data. The detecting section can apply one or more templates that extract a predetermined number of symbol sequences from the speech-to-text data, to the speech-to-text data. The concatenation of the two or more symbol sequences forms each of the candidates.

FIG. 3 shows candidates according to an embodiment of the present invention. In the embodiment of FIG. 3, the target symbol sequence is an 11-digit phone number. The "Candidates" shown in the table (e.g., 08008012551, 08008012513 . . . ) represents the candidates of the target symbol sequence detected by the detecting section. The detecting section detects candidates from the speech-to-text data "My phone number is . . . hmm 5131 right" as shown in the top of FIG. 3.

In the embodiment of FIG. 3, the detecting section detects the candidates by utilizing an 8-digits template and a 3-digits template. As to the embodiment of FIG. 3, the detection section can extract all symbol sequences having 8-digits (e.g., 08008012, 80080123 . . . ) from the speech-to-text data by using the 8-digits template. The detecting section can extract all symbol sequences having 3-digits (e.g., 551, 513 . . . ) from the speech-to-text data by using the 3-digits template such that 8-digits symbol sequences do not overlap 3-digits symbol sequences at the same time. For example, when detecting "08008012", the detecting section cannot detect "080", "800", . . . , "234" from the speech-to-text data as 3-digit symbol sequences. The concatenation of the symbol sequences (e.g., 08008012) and (e.g., 551) forms the candidate (e.g., 08008012551).

The detecting section can detect the same symbol sequence that is extracted from different portions in the speech-to-text data, as two or more candidates. In the embodiment of FIG. 3, the detecting section detects "08008012513" as shown in the second candidate and the fourth candidate. For example, the detecting section detects "08008012" from the same portion in the speech-to-text data for the candidates, while the detecting section detects "513" of the second candidate from " . . . is 55131 hmm . . . " in the speech-to-text data and detects "513" of the fourth candidate from " . . . hmm 5131 right" in the speech-to-text data.

In such a case, the detecting section can treat the two candidates of "08008012513" as different candidates. In alternative embodiments, the detection section can maintain some of a plurality of candidates having the same symbol sequence while abandoning the other candidates.

FIG. 4 shows candidates according to another embodiment of the present invention. In the embodiment of FIG. 4, the detecting section detects the candidates by utilizing a 3-digit template and two 4-digit templates. As to the embodiment in FIG. 4, the detection section can extract all symbol sequences having 3 digits (e.g., 080, 800, 008 . . . ) from the speech-to-text data by using the 3-digit template. The detecting section can extract all symbol sequences having 4 digits (e.g., 0801, 8012 . . . ) from the speech-to-text data by using the first 4-digit template such that 3-digit symbol sequences do not overlap any 4-digit symbol sequences at the same time. The detecting section can also extract all symbol sequences having 4 digits (e.g., 5513, 5131 . . . ) from the speech-to-text data by using the second 4-digit template such that 3-digit symbol sequences and 4-digit symbol sequences extracted by the first 4-digit template do not overlap any 4-digit symbol sequences extracted by the second 4-digit template at the same time.

In some embodiments, the detecting section can use all possible combinations of templates for detecting the symbol sequences. For example, the detecting section can use an 11-digit template, 10&1-digit templates, 9&2-digit templates, . . . , 1&10-digit templates, 9&1&1-digit templates, . . . , 1&1&9-digit templates, 8&1&1&1-digit templates, . . . , 1&1&1&8-digit templates, . . . , and 1&1&1&1&1&1&1&1&1&1&1-digit templates, for the target symbol having an 11-digit phone number. In an embodiment, the detecting section can use only some of all possible combinations of templates for detecting the symbol sequences, which can be predetermined by a user of the apparatus.

As explained in relation to the foregoing embodiments, the detecting section can perform the detection such that the two or more symbol sequences extracted by the templates do not overlap. In alternative embodiments, the two or more symbol sequences extracted by templates can overlap.

At S140, an extracting section, such as the extracting section 140, can extract a related portion of each candidate detected at S130, from the speech-to-text data. The related portion of each of the candidates includes a portion directly or indirectly adjacent to any of the two or more symbol sequences constituting the candidates.

In embodiment, the extracting section can extract a plurality of the related portions of the candidates from the speech-to-text data. The extracting section can extract at least one of a preceding portion (or left words) of the first symbol sequences extracted at S130, subsequent portion (or right words) of the last symbol sequences extracted at S130, and a sandwiched portion (or middle words) between two adjacent symbol sequences extracted at S130.

In some embodiments, the extracting section can extract a designated number of words (e.g., 10 words) or characters (e.g., 100 characters) as the related portion from the speech-to-text data. In an alternative embodiment, the extracting section can extract all words between the beginning of the speech-to-text and the first extracted symbol sequences, all words between the end of the speech-to-text and the last extracted symbol sequences, and/or all words between the two adjacent symbol sequences as the related portions.

FIG. 5 shows related portions according to an embodiment of the present invention. FIG. 5 shows the candidates detected according to the embodiments of FIG. 3. In the embodiment of FIG. 5, the extracting section has extracted "My phone number is," which precedes the first symbol sequence "08008012" in the speech-to-text data as the first related portion (shown as "Left Words"). The extracting section also extracts "31 hmm 5131 right" that is subsequent to the second symbol sequence "551" in the speech-to-text data as the second related portion (shown as "Right Words").

At S150, a searching section, such as the searching section 150, can detect repetition of at least a partial sequence of each candidate within the related portion of the corresponding candidate. The searching section an detect at least one of the two or more symbol sequences that constitute the corresponding candidate, within the related portion of the corresponding candidates, as the repetition. In some embodiments, the searching section can detect symbol sequences that are the same as the symbol sequence(s) detected at S130 as a part of a candidate in a related portion adjacent to the detected symbol sequence(s).

In alternative embodiments, the searching section can detect symbol sequences that are the same as the symbol sequence(s) detected at S130 as a part of one candidate in a part of/all related portions of the candidate. In further alternative embodiments, the searching section can detect symbol sequences that are the same as any portion of one candidate in all related portions of the one candidate. When the searching section does not detect repetition for a candidate, the apparatus can proceed with an operation of S170 without performing S160 for the candidate.

At S160, a labeling section, such as the labeling section 160, can label the repetition detected at S150 with a repetition indication. The labeling section can perform labeling by replacing the detected repetition with the repetition indication.

In some embodiments, the labeling section can label the detected repetition with an indication of a symbol length of the detected repetition. For example, the repetition indication may include information of the number of symbols of the detected repetition.

In other embodiments, the labeling section can label the detected repetition with an indication of a location of the detected repetition in the corresponding candidate. For example, the repetition indication may include information of a location in which the related portion includes the detected repetition (e.g., information that the detected repetition exists in the last 4-digits in the related portion).

FIG. 6 shows labeling, according to an embodiment of the present invention. FIG. 6 shows repetition indications given to the related portions detected according to the embodiments of FIG. 5. In the embodiment of FIG. 6, the searching section has detected repetition of the 3-digit symbol sequence "513" under Right Words in the second candidate in FIG. 5, and in response the labeling section has replaced the repetition "513" with the repetition indication "Rep(3)," "(3)" in "Rep(3)" represents the number of symbols within the repetition as shown in FIG. 6. The searching section also detects repetition of the 3-digit symbol sequence "131" under Right Words in the third candidate in FIG. 5, and the labeling section replaces the repetition "131" with the repetition indication "Rep(3)."

In response to two or more repetition indications being in a candidate or a related portion, the labeling section can label the detected repetitions with distinct repetition indications. For example, if there are two "Rep(3)" indications, the labeling section may label the first "Rep(3)" as "Rep(3)_1" and the second "Rep(3)" as "Rep(3)_2."

FIG. 7 shows labeling, according to another embodiment of the present invention. In the embodiment of FIG. 7, the related portions include left words, middle words, and right words that are extracted from the candidates and the speech-to-text data shown in FIG. 3. The middle words can be a portion that is sandwiched between 8-digit symbol sequences and 3-digit symbol sequences detected by the 8-digit template and the 3-digit template, respectively. In the embodiment, the repetition under Right Words of the second and die third candidate is replaced with the repetition indication.

In the embodiment of FIG. 7, the searching section can detect a repetition of both of 8-digit symbol sequences (e.g., "08008012") and 3-digit symbol sequences (e.g., "551") from the middle words (e.g., "34 oh . . . is"). The labeling section can label the repetition such that the repetitions of different symbol sequences (3-digits/8-digits symbol sequences) are distinguishable.

At S170, an estimating section, such as the estimating section 170, can estimate whether each candidate is the target symbol sequence. In some embodiments, the estimating section can calculate a probability that each candidate is the target symbol sequence by inputting the related portion of each candidate with the repetition indication into an estimation model. The estimating section can use a recurrent neural network such as Long Short-Term Memory (LSTM) as the estimation model. The estimating section may adopt at least one of a variety of types of LSTM (e.g., LSTM disclosed in Gers & Schmidhuber (2000), Cho, et al. (2014), Koutnik, et al. (2014), Yao et al. (2015), Greff, et al. (2015), or Jozefowicz, et al (2015)). The estimating section may adopt GRU as a type of LSTM, as disclosed by Junyoung Chung, Caglar Gulcehre, KyungHyun Cho, Yoshua Bengio, Empirical Evaluation of Gated Recurrent Neural Networks on Sequence Modeling. In an alternative embodiment, the estimating section can adopt another type of recurrent neural network as the estimation model.

The estimating section can input all or at least part of the related portions with the repetition indication into the LSTM. When the searching section does not detect any repetition in the related portion, at S150, the estimating section can input the related portion without any repetition indications into the LSTM.

At S170, the estimating section can list the plurality of candidates in ascending/descending order of the possibility of being the target symbol sequence, and can show the list of the candidates and the possibilities thereof on a display of the apparatus.

The apparatus can perform operations S140-S170 for each of a plurality of candidates that the detecting section has detected at S130. If the apparatus uses two or more templates (e.g., 8&3-digit templates and 4&4&3-digit templates), then the apparatus can perform operations S140-S170 for each of the plurality of candidates detected from all templates.

Thereby, the estimating section can calculate the possibility of the target symbol sequence for each of the plurality of candidates detected at S130.

At S190, the estimating section can select one candidate as the target symbol sequence among the plurality of candidates. In an embodiment, the estimating section can determine which candidate outputs the highest probability from the recurrent neural network among the plurality of candidates. The estimating section can select the candidate determined to output the highest probability as the target symbol sequence.

The obtaining section can employ additional speech-to-text data in response to the estimating section determining that the probability for each candidate is below a threshold. The obtaining section can utilize additional speech-to-text data if the highest probability of the plurality of candidates is below a threshold. The obtaining section can make use of additional speech-to-text data if a difference between the highest probability of the plurality of candidates and the second highest probability of the plurality of candidates is below a threshold. Thereby, for example, an operator at a call center can use the apparatus for inputting information of a customer, and can again request a symbol sequence (e.g., customer ID) from the customer, in response to an apparatus not being confident with the estimated symbol sequence.

As explained above, the apparatus can accurately detect the target symbol sequence with less computational resources by utilizing the indication of repetition. In particular, the apparatus can distinguish the target symbol sequence (e.g., phone number) from other confusing symbol sequences (e.g., product ID) within speech-to-text data with less computational resources by utilizing the indication of repetition.

Speakers sometimes repeat at least part of a symbol sequence that is important in conversation for confirmation. The apparatus can utilize such repetition for identifying the target symbol sequence. Specifically, during a conversation between an agent and a client, the agent can wholly or partially confirm information of the client (e.g., customer ID, phone number, etc.). Therefore, the apparatus can use only the portion of speech-to-text data corresponding to the agent's speech among whole conversation between the agent and the client, and determine the target symbol sequence based on that portion of the speech-to-text data.

Figure 8:
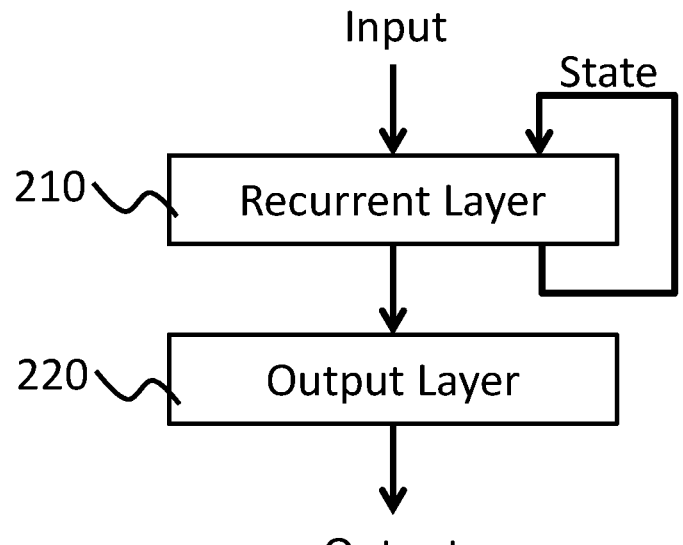
FIG. 8 shows a Recurrent Neural Network (RNN) according to an embodiment of the present invention.

FIG. 8 shows a Recurrent Neural Network (RNN) according to an embodiment of the present invention. In one embodiment, the RNN comprises a hardware implementation. In another embodiment, the RNN comprises a recurrent layer 210 and an output layer 220. As shown in FIG. 2, the recurrent layer 210 can iteratively receive a new input and calculate a next state based on the new input and a current state for each time point. In other words, the recurrent layer 210 can update a state for each input.

The recurrent layer 210 can provide the output layer 220 with an output of the recurrent layer 210 (e.g., the last state) for the candidate data. The recurrent layer 210 according to the embodiment can be implemented by an estimating section, such as the estimating section 170, and/or a training section, such as the training section 190.

The output layer 220 can process a resultant output data based on the output from the recurrent layer 210. The output layer 220 can be a softmax layer or a hierarchical softmax layer. The output layer 220 can be implemented by the estimating section and/or the training section.

Figure 9:
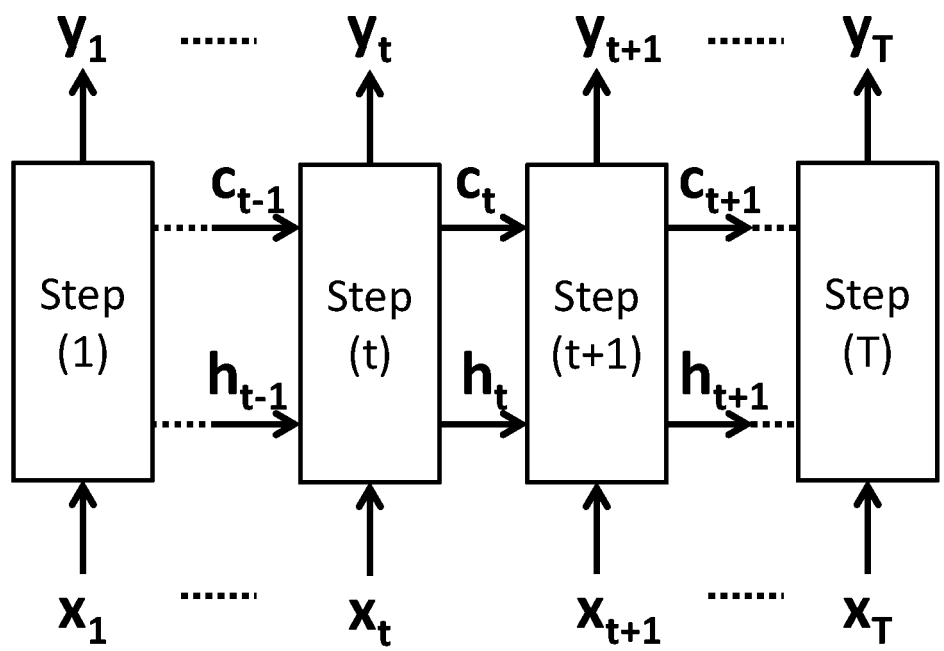
FIG. 9 shows a Long Short-Term Memory (LSTM) according to an embodiment of the present invention.

FIG. 9 shows an LSTM according to an embodiment of the present invention. For example, a recurrent layer in the RNN such as, the recurrent layer 210 can be implemented by the LSTM represented in FIG. 9. In such embodiments, a state (referred to as "the current state" and "the next state" above) includes a hidden state $h_t$ and a cell state $c_t$ for a time point t, where $t=1, \ldots, T$.

In the embodiment of FIG. 9, the LSTM can input ($c_0$, $h_0$, $x_1$), calculate ($c_1$, $h_1$), and output $y_1$ at a time point 1, ..., input ($c_{t-1}$, $h_{t-1}$, $x_t$) and calculate ($c_t$, $h_t$) at a time point t, input ($c_t$, $h_t$, $x_{t+1}$) and calculate ($c_{t+1}$, $h_{t+1}$) at a time point t+1, ..., input ($c_{T-1}$, $h_{T-1}$, $x_T$) and calculate ($c_T$, $h_T$) at a time point T. The LSTM can output yt for time point t, which can be the same as the hidden state $h_t$. The LSTM can output $y_T$ at the last time point T as the last state of the recurrent layer.

Figure 10:
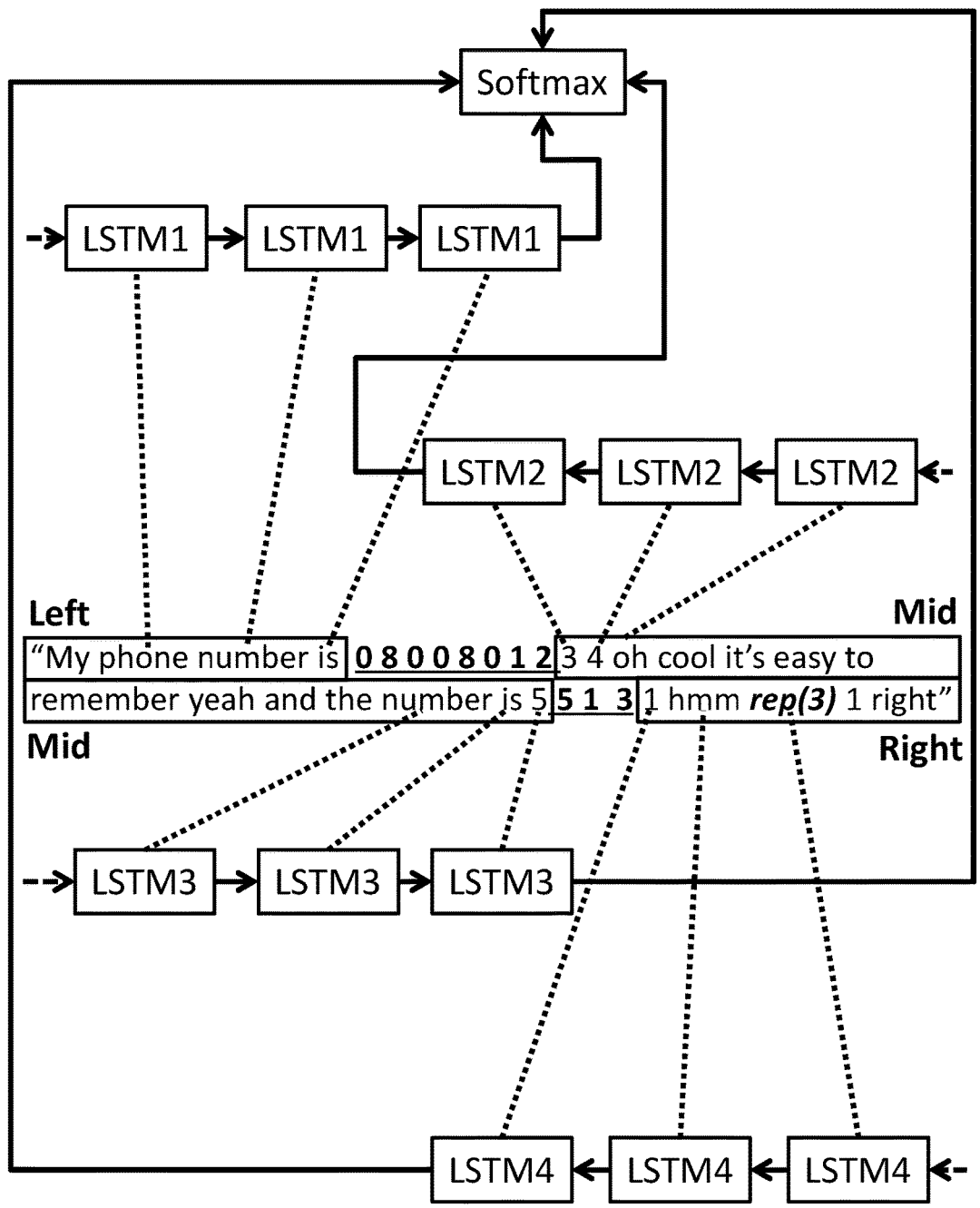
FIG. 10 shows an estimation model according to an embodiment of the present invention.

FIG. 10 shows an estimation model according to an embodiment of the present invention. The estimating section can use a plurality of recurrent neural networks for processing a candidate. In an embodiment, the estimating section can input each of a plurality of the related portions of each candidate with labeled repetitions into one of a plurality of recurrent neural networks, each having independent weights. The estimating section can input each word (or the repetition indication) in a related portion into a recurrent neural network in a direction of an order of the text (i.e., left to right) or a direction of an inverse order of the text (i.e., right to left).

Each of the plurality of the related portions of each candidate with repetition indications is input to one of the plurality of recurrent neural networks in a direction depending on a location of each of the plurality of the related portions of each candidate or the symbol sequences constituting each candidate. Thereby, the estimating section can reduce computational resources and achieve high accuracy of estimation of the target symbol sequence by taking relative location of the related portion and the candidate/symbol sequences into consideration.

In the embodiment of FIG. 10, the speech-to-text data is the same as FIG. 3, and the candidate is "08008012513" comprised of symbol sequence "08008012" detected by the 8-digit template and symbol sequence "513" detected by the 3-digit template. The related portion includes left words "My phone number is", middle words "34 oh cool it's easy to remember yeah and the number is 5" and right words "1 hmm rep(3) 1 right" having the repetition indication "rep (3)."

In the embodiment of FIG. 10, the estimating section can use LSTM1 for the left words, use LSTM2 and LSTM3 for the middle words, and use LSTM4 for the right words. The estimating section can input the left words into LSTM1 in an original order of the left words. For example, the estimating section can first input a first word "My" of the left words into LSTM1 and calculate a first output of the first word, then input the first output and the second word "phone" into LSTM1 and calculate a second output, then input the second output and the third word "number" into LSTM1 and calculate a third output, input the third output and the fourth ward "is" into LSTM1 and calculate a fourth output, and input the fourth output (i.e., the last output) into a softmax layer.

The estimating section can input the middle words into LSTM2 in an original order of the middle words. The estimating section can first input a first word "3" of the middle words into LSTM2 and calculate a first output of the first word, then input the first output and the second word "4" into LSTM2 and calculate a second output, . . . , input the thirteenth output and a fourteenth word "5" into LSTM2 and calculate a fourteenth output (i.e., the last output), and input the fourteenth output into the softmax layer.

The estimating section can also input the middle words into LSTM3 in an inverse order of the middle words. The estimating section can first input a first word "5" into LSTM3 and calculate a first output of the first word, then input the first output and the second word "is" into LSTM3 and calculate a second output, . . . , input the thirteenth output and a fourteenth word "3" into LSTM3 and calculate a fourteenth output (i.e., the last output), and input the fourteenth output into the softmax layer. Thereby the estimating section may input the related portion between the two symbol sequences into bi-directional LSTMs.

The estimating section can also input right words into LSTM4 in the inverse order of the right words. The estimating section can first input a first word "right" into LSTM4 and calculate a first output of the first word, then input the first output and the second word "1" into LSTM4 and calculate a second output, then input the second output and the third word (or the repetition indication) "rep(3)" into LSTM4 and calculate a third output, then input the third output and the fourth word "hmm" into LSTM4 and calculate a fourth output, then input the fourth output and a fifth word "1" into LSTM4 and calculate a fifth output (i.e., the last output), and input the fifth output into the softmax layer.

The estimating section can estimate the possibility of the target symbol sequence by performing calculation of the softmax layer, based on the outputs received from LSTM1, LSTM2, LSTM3, and LSTM4. Thereby, according to the embodiment of FIG. 10, the estimating section can maintain accuracy of estimation of the target symbol sequence with less computational resources than an embodiment where only one LSTM is used as the estimation model.

Figure 11:
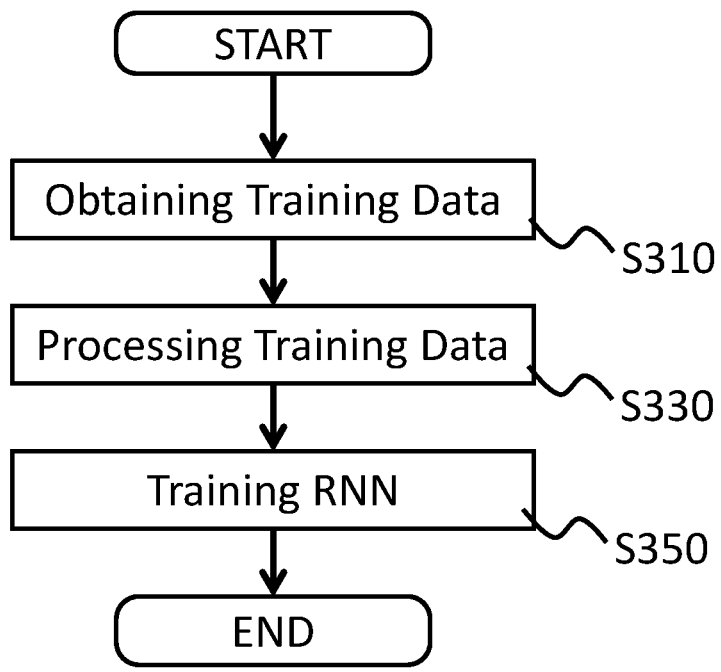
FIG. 11 shows a second operational flow according to an embodiment of the present invention.

FIG. 11 shows a second operational flow according to an embodiment of the present invention. The present embodiment describes an example in which an apparatus, such as the apparatus 10, performs the operations from S310 to S350, as shown in FIG. 11. The apparatus can train a recurrent neural network to estimate a target symbol sequence by performing the operation of S310-S350.

At S310, an obtaining section, such as the obtaining section 110, can obtain one or more training data for training an estimation model such as a recurrent neural network. Each training data can include a speech-to-text data paired with a symbol sequence used as the correct symbol sequence. The correct symbol sequence can be previously determined by a person who reviews the speech-to-text data.

At S330, the apparatus can process the training data obtained at S310 to extract related portions with repetition indications for each speech-to-text data of the two or more of training data. In some embodiments, the apparatus can perform the operations of S110-S160 for each speech-to-text data of the two or more training data.

At S350, a training section such as the training section 190 can train a recurrent neural network such as LSTM explained in relation to S170 by backpropagation. In such embodiments, the training section can perform the training by updating weights (or parameter) of the LSTM so as to reduce errors between the allocated probability and the output of the LSTM of candidates of each speech-to-text data. In the embodiment, the training section can allocate a probability of 1 (or 100%) to candidate(s) that is the same as the correct symbol sequence, and, allocating a probability of 0 (or 0%) to other candidate(s).

The training section can iterate updating the weights of each LSTM until a sum of errors obtained from a plurality of candidates of two or more speech-to-text data is below a threshold, or does not reduce by a threshold.

In the embodiment of FIG. 10, the training section can train four LSTMs (LSTMs 1-4) and the softmax layer. Thereby, the apparatus can optimize LSTMs to detect the target symbol sequence in both direction of the text.

In many embodiments, the apparatus can detect the same portion as a part of a candidate as a repetition. In alternative embodiments, the searching section can detect a similar portion that is similar to at least a partial sequence of each of the candidates from the related portion, of each of the candidates. The similar portion can be different in one or two symbols from the at least partial sequence (e.g., symbol sequences detected by templates) of each candidate. The labeling section can label the detected similar portion with information indicating similarity (e.g., "SIM(3)"). The estimating section can estimate whether each of the candidates is the target symbol sequence, based on the indicated repetition and the similar portion of the each candidate.

In some embodiments, the apparatus can determine one or more templates used at S130 of FIG. 2 based on a result of the training. For example, the apparatus can perform the operations of FIG. 11 for each of the possible templates by one part of the training data to generate a plurality of estimation models corresponding to each possible template. The apparatus can evaluate each estimation model by the other part of the training data, and select a part of the possible templates based on a result of the evaluation.

Although many embodiments utilizing the recurrent neural network are explained above, in some embodiments the apparatus can use Support Vector Machine (SVM) instead of the recurrent neural network as the estimation model. In the embodiments, the estimating section can input Bag of Words instead of text itself into the estimation model as the related portions. For example, at the operation of S170 in FIG. 2, the estimating section can generate Bag of Words corresponding to the related portion(s) with the repetition indication generated at S160, then input the Bag of Words into SVM. At the operation of S350, the training section can train SVM instead of the recurrent neural network by utilizing Bag of Words generated from the training data. In alternative embodiments, the training section can train, any other discriminative models as the estimation model by utilizing Bag or Words. According to these embodiments, the related portions are represented by a fixed length vectors.

Figure 12:
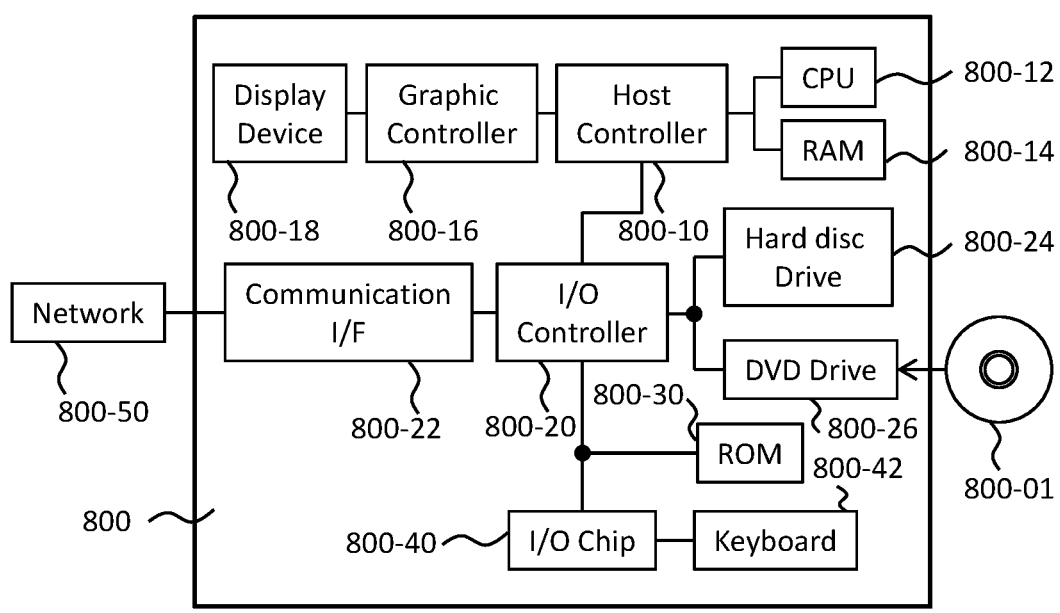
FIG. 12 shows an exemplary hardware configuration of a computer that functions as a system, according to an embodiment of the present invention.

FIG. 12 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, a sound controller, and a display device 800-18, which are mutually connected by a host controller 800-10. The computer 800 also includes input output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18. The sound controller can obtain sound from a connected microphone or other audio input device. The sound controller can generate sound on a connected speaker or other audio output device.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by a computer program product (e.g., computer readable media such as the DVD-ROM 800-01 or the IC card). The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted bye, realizing the operation or processing of information in accordance with the usage of the computer 800.

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01 or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the net work and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination, of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, card stages of each process performed by an apparatus, system, program, and method shown in the claims, embodiments, or diagrams can be performed in any order as long as the order is not indicated by "prior to," "before," or the like and as long as the output from a previous process is not used in a Later process. Even if the profess flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:
1. A computer-implemented method comprising:
  detecting one or more candidates of a target symbol sequence from a speech-to-text data;
  extracting a related portion of each candidate from the speech-to-text data;

detecting repetition of at least a partial sequence of each candidate within the related portion of the corresponding candidate;

labeling the detected repetition with a repetition indication; and estimating, by employing a trained estimation model with a plurality of Long Short-Term Memory (LSTM) neural networks feeding into a softmax layer, whether each candidate is the target symbol sequence, using the corresponding related portion including the repetition indication of each of the candidates, with the estimation model using less computational resources than a single LSTM neural network, wherein each candidate is divided into left words, middle words, and right words, with the left words being recursively fed into a first LSTM neural network to generate a first output, the middle words being recursively fed into a second LSTM neural network to generate a second output, the middle words being recursively fed inversely into a third LSTM neural network to generate a third output, and the right words being recursively fed inversely into a fourth LSTM neural network to generate a fourth output, with the first output, the second output, the third output, and the fourth output being fed into the softmax layer.

2. The method of claim 1, wherein the detecting the one or more candidates of the target symbol sequence from the speech-to-text data includes extracting two or more symbol sequences that constitute each of the candidates, from the speech-to-text data, wherein the two or more symbol sequences are separate from each other in the speech-to-text data.

3. The method of claim 2, wherein detecting repetition of at least a partial sequence of each candidate within the related portion of the corresponding candidate includes detecting at least one of the two or more symbol sequences that constitute the corresponding candidate within the related portion of the corresponding candidates.

4. The method of claim 2, wherein the extracting two or more symbol sequences are performed by extracting the predetermined number of symbol sequences, the two or more symbol sequences do not overlap, and the concatenation of the two or more symbol sequences forms each of the candidates.

5. The method of claim 1, wherein the related portion of each of the candidates includes a portion adjacent to the each of the candidates.

6. The method of claim 5, wherein the estimating whether each candidate is the target symbol sequence, based on the repetition indication of each corresponding candidate includes estimating a probability that each candidate is the target symbol sequence by inputting the related portion of each candidate with the repetition indication into a recurrent neural network.

7. The method of claim 6, wherein the estimating whether each candidate is the target symbol sequence, based on the repetition indication of each corresponding candidate further includes determining which candidate outputs the highest probability from the recurrent neural network among the candidates.

8. The method of claim 6, wherein the extracting a related portion for each candidate from the speech-to-text data includes extracting a plurality of the related portions of the candidates from the speech-to-text data, wherein the estimating a probability that each candidate is the target symbol sequence by inputting the related portion of each of the candidates with labelled repetition into a recurrent neural network includes inputting each of the plurality of the related portions of each of the candidates with labelled repetition into a recurrent neural network among a plurality of recurrent neural networks, and wherein each of the plurality of the related portions of each of the candidates with repetition indications is input into a recurrent neural network among the plurality of recurrent neural networks in a direction depending on a location of each of the plurality of the related portions to the each of the candidates.

9. The method of claim 6, further comprising:

requiring additional speech-to-text data in response to determining that the probabilities for the candidates are below a threshold.

10. The method of claim 1, wherein the labeling the detected repetition with the repetition indication includes labeling the detected repetition with an indication of a symbol length of the detected repetition.

11. The method of claim 1, wherein the labeling the detected repetition with the repetition indication includes labeling the detected repetition with an indication of a location of the detected repetition in the each candidate.

12. The method of claim 1, further comprising:

detecting a similar portion that is similar to at least a partial sequence of each of the candidates from the related portion of each of the candidates, and labeling the detected similar portion with information indicating similarity, and wherein the estimating whether each candidate is the target symbol sequence, using the corresponding related portion including the repetition indication of each of the candidates includes estimating whether each of the candidates is the target symbol sequence, based on the repetition indication and the similar portion of the each candidate.

13. The method of claim 1, wherein words being recursively fed includes every word of each candidate being fed into each respective LSTM neural network to generate an output and to have each output fed into each respective LSTM neural network along with the word following the word employed to generate the output.

14. An apparatus comprising:

a processor; and one or more computer readable mediums collectively including instructions that, when executed by the processor, cause the processor to perform operations comprising:

detecting one or more candidates of a target symbol sequence from a speech-to-text data, extracting a related portion of each candidate from the speech-to-text data, detecting repetition of at least a partial sequence of each candidate within the related portion of the corresponding candidate, and labeling the detected repetition with a repetition indication, estimating, by employing a trained estimation model with a plurality of Long Short-Term Memory (LSTM) neural networks feeding into a softmax layer, whether each candidate is the target symbol sequence, based on the corresponding related portion including the repetition indication of each of the candidates, with the estimation model using less computational resources than a single LSTM neural network, wherein each candidate is divided into left words, middle words, and right words, with the left words being recursively fed into a first LSTM neural network to generate a first output, the middle words being recursively fed into a second LSTM neural network to generate a second output, the middle words being recursively fed inversely into a third LSTM neural network to generate a third output, and the right words being recursively fed inversely into a fourth LSTM neural network to generate a fourth output, with the first output, the second output, the third output, and the fourth output being fed into the softmax layer.

15. The apparatus of claim 14,
wherein the detecting the one or more candidates of the target symbol sequence from the speech-to-text data includes
extracting two or more symbol sequences that constitute each of the candidates, from the speech-to-text data, wherein the two or more symbol sequences are separate from each other in the speech-to-text data.

16. The apparatus of claim 15, wherein detecting repetition of at least a partial sequence of each candidate within the related portion of the corresponding candidate includes
detecting at least one of the two or more symbol sequences that constitute the corresponding candidate within the related portion of the corresponding candidates.

17. The apparatus of claim 15, wherein the extracting two or more symbol sequences are performed by extracting the predetermined number of symbol sequences, the two or more symbol sequences do not overlap, and the concatenation of the two or more symbol sequences forms each of the candidates.

18. The apparatus of claim 17, wherein the related portion of each of the candidates includes a portion adjacent to the each of the candidates.

19. The apparatus of claim 18, wherein the estimating whether each candidate is the target symbol sequence, based on the repetition indication of each corresponding candidate includes
estimating a probability that each candidate is the target symbol sequence by inputting the related portion of each candidate with the repetition indication into a recurrent neural network.

20. A non-transitory computer readable storage medium having instructions embodied therewith, the instructions executable by a processor or programmable circuitry to cause the processor or programmable circuitry to perform operations comprising:
detecting one or more candidates of a target symbol sequence from a speech-to-text data,
extracting a related portion of each candidate from the speech-to-text data,
detecting repetition of at least a partial sequence of each candidate within the related portion of the corresponding candidate, and
labeling the detected repetition with a repetition indication,
estimating, by employing a trained estimation model with a plurality of Long Short-Term Memory (LSTM) neural networks feeding into a softmax layer, whether each candidate is the target symbol sequence, based on the corresponding related portion including the repetition indication of each of the candidates, with the estimation model using less computational resources than a single LSTM neural network, wherein each candidate is divided into left words, middle words, and right words, with the left words being recursively fed into a first LSTM neural network to generate a first output, the middle words being recursively fed into a second LSTM neural network to generate a second output, the middle words being recursively fed inversely into a third LSTM neural network to generate a third output, and the right words being recursively fed inversely into a fourth LSTM neural network to generate a fourth output, with the first output, the second output, the third output, and the fourth output being fed into the softmax layer.

21. The non-transitory computer readable storage medium of claim 20, wherein the detecting the one or more candidates of the target symbol sequence from the speech-to-text data includes
extracting two or more symbol sequences that constitute each of the candidates, from the speech-to-text data, wherein the two or more symbol sequences are separate from each other in the speech-to-text data.

22. The non-transitory computer readable storage medium of claim 21, wherein detecting repetition of at least a partial sequence of each candidate within the related portion of the corresponding candidate includes
detecting at least one of the two or more symbol sequences that constitute the corresponding candidate within the related portion of the corresponding candidates.

23. The non-transitory computer readable storage medium of claim 21, wherein the extracting two or more symbol sequences are performed by extracting the predetermined number of symbol sequences, the two or more symbol sequences do not overlap, and the concatenation of the two or more symbol sequences forms each of the candidates.

24. The non-transitory computer readable storage medium of claim 23 wherein the related portion of each of the candidates includes a portion adjacent to the each of the candidates.

25. The non-transitory computer readable storage medium of claim 24, wherein the estimating whether each candidate is the target symbol sequence, based on the repetition indication of each corresponding candidate includes estimating a probability that each candidate is the target symbol sequence by inputting the related portion of each candidate with the repetition indication into a recurrent neural network.

* * * * *